(12) United States Patent
Pankow

(10) Patent No.: US 8,458,917 B1
(45) Date of Patent: Jun. 11, 2013

(54) MULTI-AXIS LEVEL

(75) Inventor: Roger Allen Pankow, Salt Lake City, UT (US)

(73) Assignee: Idea Farm LLC, Salt Lake City, UT (US)

( * ) Notice: Subject to any disclaimer, the term of this patent is extended or adjusted under 35 U.S.C. 154(b) by 330 days.

(21) Appl. No.: 13/032,329

(22) Filed: Feb. 22, 2011

Related U.S. Application Data

(60) Provisional application No. 61/308,097, filed on Feb. 25, 2010.

(51) Int. Cl.
*G01C 9/34* (2006.01)
*G01C 9/36* (2006.01)

(52) U.S. Cl.
USPC ............................................. 33/381; 33/390

(58) Field of Classification Search
USPC .................................................... 33/379–390
See application file for complete search history.

(56) References Cited

U.S. PATENT DOCUMENTS

| | | | | |
|---|---|---|---|---|
| 1,418,544 A * | 6/1922 | Dodge | ............................ | 33/382 |
| 4,109,392 A * | 8/1978 | Streeter | ............................ | 33/381 |
| 5,509,210 A * | 4/1996 | Murphy | ............................ | 33/382 |
| 5,749,152 A * | 5/1998 | Goss et al. | ............................ | 33/381 |
| 6,477,781 B1 * | 11/2002 | Blatt | ............................ | 33/384 |
| 7,152,335 B2 * | 12/2006 | Nichols | ............................ | 33/390 |
| 8,109,005 B2 * | 2/2012 | Hudson et al. | ............................ | 33/377 |
| 2006/0196061 A1 * | 9/2006 | Nichols | ............................ | 33/390 |
| 2009/0313839 A1 * | 12/2009 | Spaulding et al. | ............................ | 33/382 |
| 2011/0119941 A1 * | 5/2011 | Steele et al. | ............................ | 33/379 |

* cited by examiner

*Primary Examiner* — G. Bradley Bennett
(74) *Attorney, Agent, or Firm* — Kirton McConkie; Evan R. Witt

(57) ABSTRACT

A multi-axis level is disclosed having a body member with two side members forming a right angle therebetween. The body has a length extending in a longitudinal direction. The multi-axis level also includes a bubble housing coupled to the body member. One or more bull's eye bubble levels are coupled to the bubble housing, which is oriented in a plane normal to the longitudinal direction. Additionally, a tubular bubble level is coupled to the bubble housing. A tube of the tubular bubble level has a length that is oriented parallel to the longitudinal direction.

20 Claims, 10 Drawing Sheets

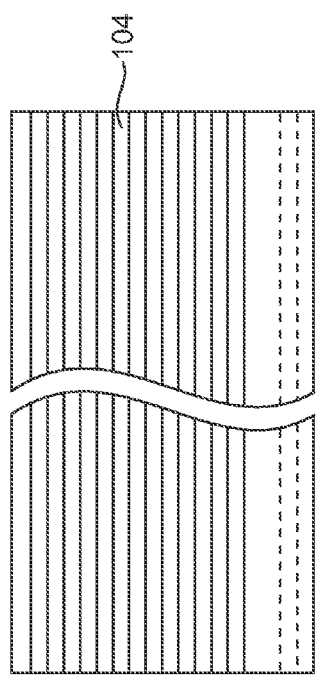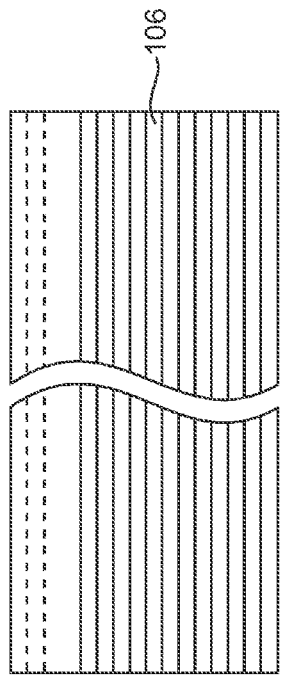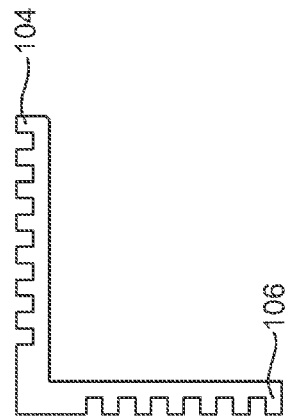

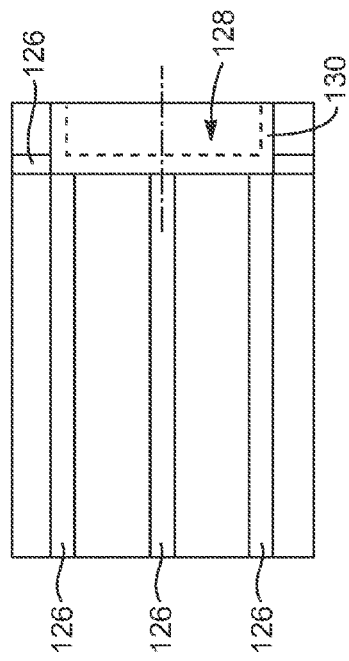
FIG. 5
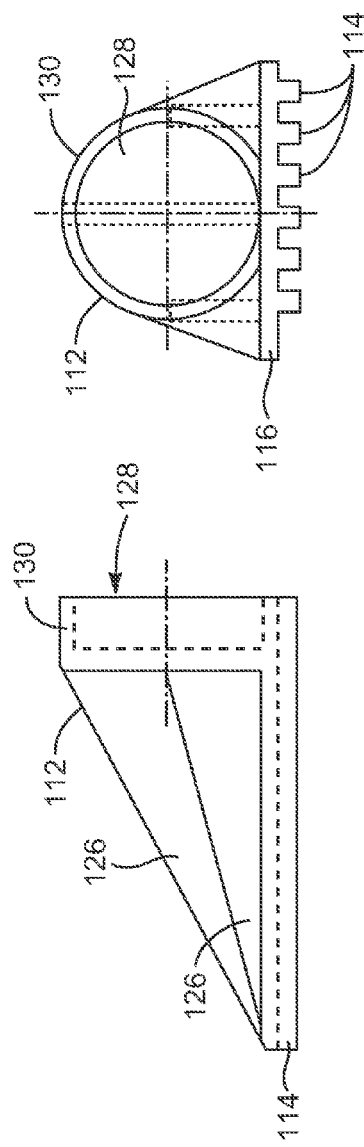
FIG. 6
FIG. 7

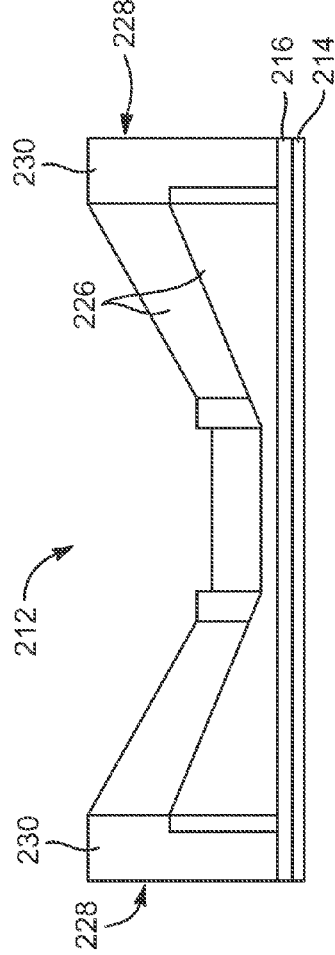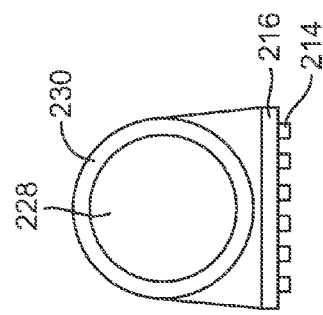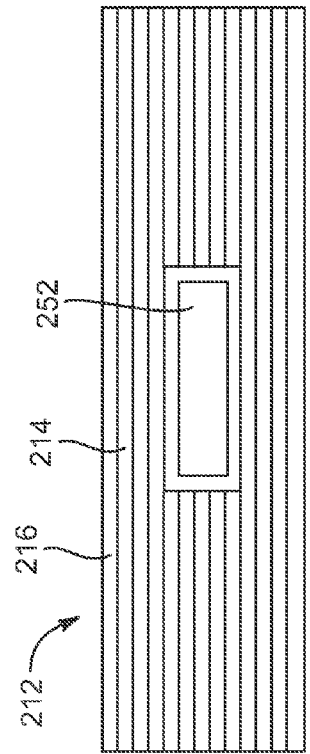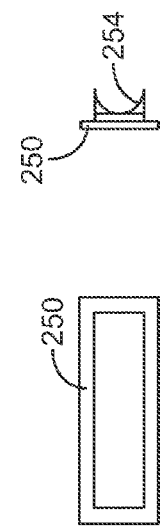

MULTI-AXIS LEVEL

RELATED APPLICATIONS

This application claims the benefit of U.S. Provisional Application No. 61/308,097 filed Feb. 25, 2010, entitled MULTI-AXIS LEVEL, which is herein incorporated by reference in its entirety.

BACKGROUND

Bubble levels, also known as spirit levels, (herein after "levels") are instruments designed to indicate whether a surface is horizontal (level) or vertical (plumb). Levels are used by carpenters, stone masons, bricklayers, other building trades workers, surveyors, millwrights and other metalworkers, and various other workers.

Levels indicate whether a surface is level in one direction or two. Common one-directional levels include tubular bubble levels, which feature a slightly curved glass tube that is incompletely filled with a liquid, leaving a bubble in the tube. At slight inclinations the bubble will travel away from the center position, which is usually marked in some manner. Two-dimensional levels include a bull's eye bubble level, which indicates the level of two perpendicular directions. The bull's eye level includes a bull's eye flat-bottomed device with the liquid under a slightly convex glass face which indicates the center clearly. The bull's eye level includes a bubble that travels away from the center position at slight inclinations in two dimensions rather than one, as with the tubular bubble level.

SUMMARY

The devices of the present disclosure have been developed in response to problems and needs in the art that have not yet been fully resolved by currently available level devices. Thus, these multi-axis leveling devices are developed to enable users to instantly level any object or apparatus that has a vertical plane or angle that is perpendicular to horizontal, as well as level planar and non-planar horizontal surfaces.

One aspect of the present invention provides a multi-axis level having a body member and a bubble housing coupled to the body member. The body member has two side members forming a right angle therebetween. The body also has a length extending in a longitudinal direction. The bubble housing includes one or more bull's eye bubble levels coupled to the bubble housing and oriented in a plane normal to the longitudinal direction. The bubble housing also includes a tubular bubble level coupled to the bubble level. The tubular bubble level having a length that is oriented parallel to the longitudinal direction.

In another aspect, a multi-axis level includes a body member forming a right angle and a bubble housing coupled to the body member. Two bull's eye bubble levels are coupled to the bubble housing and oriented in separate planes that are normal to the longitudinal direction. The two bull's eye bubble levels are oriented in opposite directions. A tubular bubble level has a tube that is coupled to the bubble housing. The tubular bubble level has a length that is oriented parallel to the longitudinal direction.

In yet another aspect, a multi-axis level, includes a body member having two equal-length side members. The two side members each have a substantially flat surface that join together to form a right angle. The body has a length extending in a longitudinal direction. The two side members each having an angled edge with an edge surface. The edge surfaces are disposed on a common plane. The body member has one or more recesses formed therein. One or more protrusions of a bubble housing are coupled to one or more recess within the body. The bubble housing has an internal receptacle and a receptacle cap, the receptacle cap closes an opening of the receptacle. Two bull's eye bubble levels are coupled to the bubble housing and oriented in parallel planes normal to the longitudinal direction. The two bull's eye bubble levels are oriented in opposite directions. A tubular bubble level is housed within the internal receptacle of the bubble housing, the internal receptacle having a length that is oriented parallel to the longitudinal direction.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

FIG. 2 is a top view of the body of the multi-axis level of FIG. 1.

FIG. 3 is a front view of the body of the multi-axis level of FIG. 1.

FIG. 4 is an end view of the body of the multi-axis level of FIG. 1.

FIG. 5 is a top view of the bubble housing of the multi-axis level of FIG. 1.

FIG. 6 is a side view of the bubble housing of the multi-axis level of FIG. 1.

FIG. 7 is an end view of the bubble housing of the multi-axis level of FIG. 1.

FIG. 13 is a side view of the bubble housing of FIG. 11.

FIG. 14 is an end view of the bubble housing of FIG. 11.

FIG. 15 is a bottom view of the bubble housing of FIG. 11.

FIG. 16 is an end view of a cap of bubble housing of FIG. 15.

FIG. 17 is a top view of the cap of FIG. 16.

DETAILED DESCRIPTION OF THE INVENTION

Embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

The present invention relates in general to a multi-axis leveling device that can be used to instantly level any object or apparatus that has a vertical plane or angle that is perpendicular to horizontal and horizontal plane or surface. Non-limiting examples of such objects include: a fence post, a stove or refrigerator, the junction of two walls in the construction of a building, a basketball standard pole, a light pole, etc. The multi-axis level utilizes a bull's eye bubble level and a tubular bubble level to determine when or if the object is truly level or plumb in all vertical directions at the same time. The body of the multi-axis leveling device is designed using a right angle thus allowing it to be used with reliability on most surfaces including flat, round, and angled horizontal and vertical surfaces. The multi-axis leveling device can also be designed so that it can be used with one hand allowing the other hand free to move and adjust the object being leveled. If desired, the device could easily be retained by a strap, elastic cord, or other retaining device to provide hands free operation.

The construction of the multi-axis level can protect the vials of the bull's eye bubble level and the tubular bubble level from physical damage, such as may occur if the level is dropped or bumped against a hard surface. In some embodiment, the vials are disposed in one or more bubble housings designed to protect the vials from impact and wear. The multi-axis level is fabricated of materials that are durable and able to withstand a normal degree of abuse associated with construction work and maintain the reliability and precision needed to function as an accurate leveling device. Such materials include, but are not limited to plastics, composites, metals, and metal alloys. Such materials are preferably light weight yet sturdy. In certain configurations, these are fabricated from acrylonitrile butadiene styrene (ABS) plastic.

Figure 1:
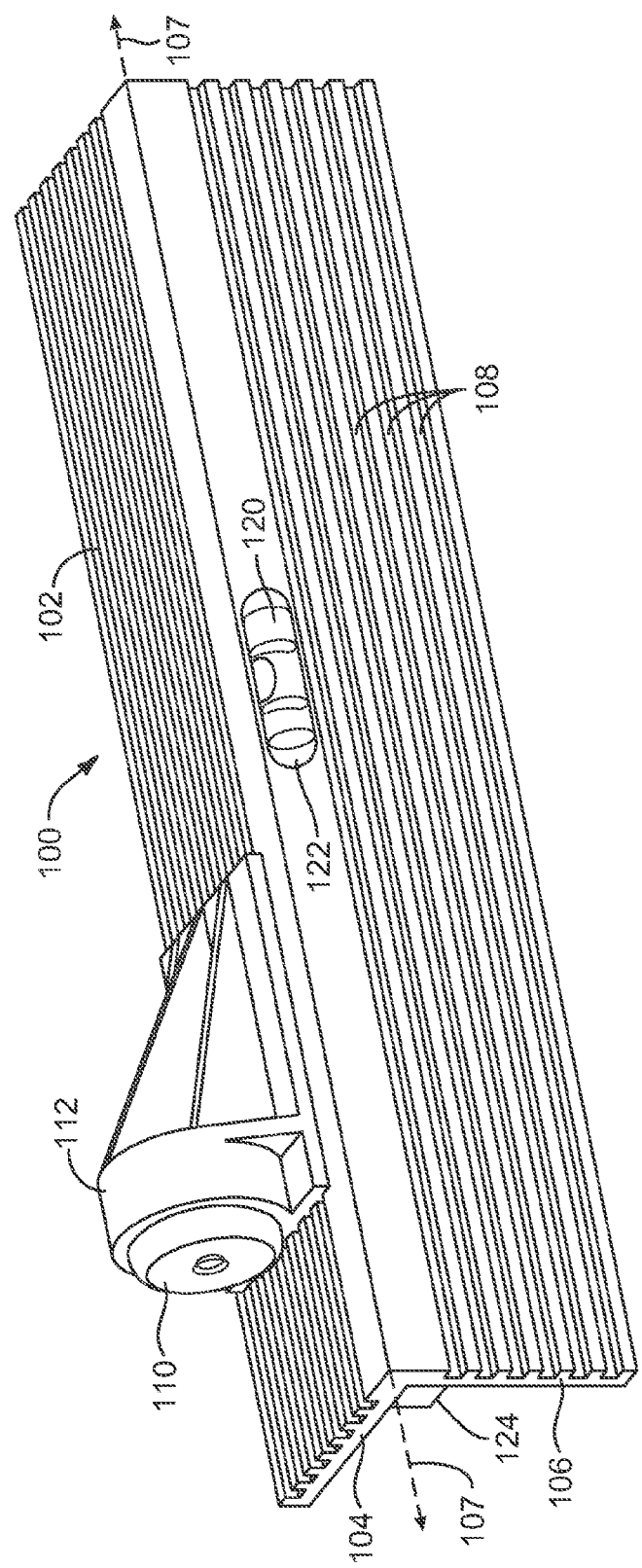
FIG. 1 is a perspective view of a multi-axis level having a single bull's eye bubble level and a single tubular bubble level, according to some embodiments.

FIG. 1 shows a one embodiment of a multi-axis level 100. The multi-axis level 100 includes a body 102. The body 102 includes first side member 104 and second side member 106 that are joined to form a right angle 124. The right angle configuration allows the multi-axis level 100 to be used reliably on most vertical and horizontal surfaces, including flat, round, and angled surfaces. In one non-limiting embodiment, the body is fabricated of polymeric material. Alternative materials, including those identified above, may be used to fabricate the level based upon industrial engineering and functional needs, balanced with economic materials and production methods. FIGS. 2-4 show top, front, and end views, respectively, of a non-limiting embodiment of the body 102. It will be appreciated that the illustrated dimensions may be modified without departing from the scope of the invention, including length, thickness, number of ribs, etc.

In the embodiment shown in FIG. 1, the first and second side members 104, 106 include inner surfaces that are substantially flat or planar. These side members form the body member 102, which has a length that extends in a longitudinal direction 107. As shown, the longitudinal direction 107 also can be as a longitudinal axis that is substantially parallel to each of the longitudinal edges of the body.

The first and second surfaces 104, 106 may comprise a plurality of recesses 108. As shown, in some instances, the recesses 108 are longitudinal grooves. In other instances, grooves can be disposed in non-longitudinal direction. Additionally, other forms of recesses can be formed in the body 102, such as indents, holes, each of which may have any of a variety of shapes. Longitudinal recesses 108 can be useful to provide strength and rigidity to the body 102. Such recesses 108 can benefit body designs made of a polymeric material. In a non-limiting embodiment, the body 102 is fabricated by extruding a suitable polymeric material, into which recesses 108 are formed during the extrusion process. In another non-limiting embodiment, the recesses 108 may be formed, cut, or machined into the body 102 after it is fabricated.

Referring to FIGS. 1 and 5-7, in certain configurations, the multi-axis level 100 includes a single bull's eye bubble level 110 that is secured within a bubble housing 112. The bull's eye bubble level 110 can be secured within a robust bubble housing 112 that fixedly positions the bull's eye bubble level 110 relative to the first and second surfaces 104, 106 so that a precise and reproducible level measurements can be made, even after dropping, bumping, or mishandling the multi-axis level 100. Accordingly, as shown, the bubble housing 112 can include a lower surface 116 from which a bull's eye bubble housing 130 extends. In some embodiments, the bull's eye bubble housing 130 extends perpendicularly from the substantially planar lower surface 116. Thus, in some instances, the bull's eye bubble housing 130 orients the bull's eye bubble level 110 in a plane normal to the longitudinal direction 107, so that the bull's eye bubble level 110 may properly indicate a vertical orientation of the multi-axis level.

In one non-limiting embodiment, the body 102 and bubble housing 112 are fabricated of polymeric materials that may be securely bonded together via an adhesive or other chemical or mechanical fastener. In certain configurations, these are fabricated from acrylonitrile butadiene styrene (ABS) plastic. The bubble housing 112 may be injection molded. In some instances, the body 102 and the bubble housing 112 are integrally formed as a single-piece structure. For instance, these parts can be molded as a single-piece structure.

In some instances, the bull's eye bubble housing 130 is circular and/or matches the outer surface of the bull's eye bubble level 110. In other instances, the bull's eye bubble housing 130 has other shapes and configurations. As shown in FIGS. 5-7, the bull's eye bubble housing 130 can include a cavity 128 that is shaped and sized to receive and support a bull's eye bubble level 110. The bull's eye bubble level 110 can be coupled within the cavity 128 via a fastener, such as an adhesive, a pin, a brad, a screw, a snap-fit lock, of other type of fastener.

To provide structural support to the bull's eye bubble level 110, one or more support members 126 can extend from the lower surface 116 of the bubble housing 112 and connect to the bull's eye bubble housing 130. These support members 126 can prevent sagging, swaying, displacement, or other movements of the bull's eye bubble housing 130. Additionally, these support members 126 can strengthen and protect the bubble housing 112 from impact or other damage. The eye bubble housing 130 can be supported by multiple support members 126. In a non-limiting example, as shown, three support members 126 support the back side (opposite the face of the bull's eye bubble level 110) of the bull's eye bubble housing 130, while two support members 126 support the lateral sides of the bull's eye bubble housing 130. In other configurations, more or less than five support members 126 are disposed on the bubble housing, such as one, two, three, four, six, seven, eight or more. Furthermore, support members 126 can be configured to support the bull's eye bubble housing 130 from other directions, such as from the front face of the bull's eye bubble level 110 or from one or more diagonal directions. In other instances, the bubble housing has no support members 126, but the bull's eye bubble housing 130 is shaped and sized to be sufficiently strong to withstand impacts without other aid.

Referring again to FIG. 1, in some embodiments, the multi-axis level 100 includes a tubular bubble level 120. In some instances, the tubular bubble level 120 is secured directly to the body 102. The length of the tubular bubble level 120 can be oriented parallel to the longitudinal direction 107. In other embodiments, one or more additional tubular bubble levels 120 can be oriented perpendicular and/or parallel to the longitudinal direction 107 to provide additional measurement abilities.

As shown in FIG. 1, the tubular bubble level 120 can be secured within a receptacle 122. Receptacle 122 may be molded or machined into body 102. Alternatively, the tubular bubble level 120 may be secured within a tubular level housing (not shown) which can be secured to the body 102 in a manner similar to the bubble housing 112. In yet another alternative embodiment, the bubble housing 112 may be designed to include a housing for the tubular bubble level 120, such that both the bull's eye bubble level and the tubular bubble level are secured within the bubble housing 112. Such an embodiment may facilitate fabrication and assembly of the multi-axis level 100.

While the embodiment shown in FIG. 1 shows one bull's eye bubble level 110 and one tubular bubble level 120, it will be appreciated that the multi-axis level 100 may include more than one bull's eye bubble level 110 and/or more than one tubular bubble level 120. In such cases, a single or pair of bubble housings 112 may be provided which may be mounted on the same or on different surfaces 104, 106. Similarly, more than one tubular bubble levels may be disposed on the multi-axis level 100 which may be mounted on the same or on different surfaces 104, 106.

FIGS. 5-7 show top, side, and end views of one non-limiting bubble housing 112 that may be mounted on the multi-axis level 100. It will be appreciated that the illustrated dimensions in FIGS. 5-7 may be modified without departing from the scope of the invention, including length, thickness, diameter, number of ribs, etc. As seen in end view of FIG. 7, the bubble housing 112 includes a plurality of protrusions 114 extending along a lower surface 116. The protrusions 114 are sized to complement recesses 108 such that protrusions 114 fit within the recesses 108 in the body 102 to facilitate accurate, precise alignment and bonding between bubble housing 112 and body 102. For example, in some configurations, the protrusions 114 are ribs that are co-aligned with grooves within the bubble housing and shaped such that the ribs can be securely inserted into the grooves to correctly align the bubble housing 112 on the body 102. In other instances, this interface is reversed, so that the protrusions extend from the body 110, while the recesses 108 are formed within the bubble housing 112. In other embodiments, not shown, the bubble housing can have alternative alignment structures, instead of protrusions 114, which serve the same function of facilitating alignment and secure bonding between bubble housing 112 and body 102.

Figure 8:
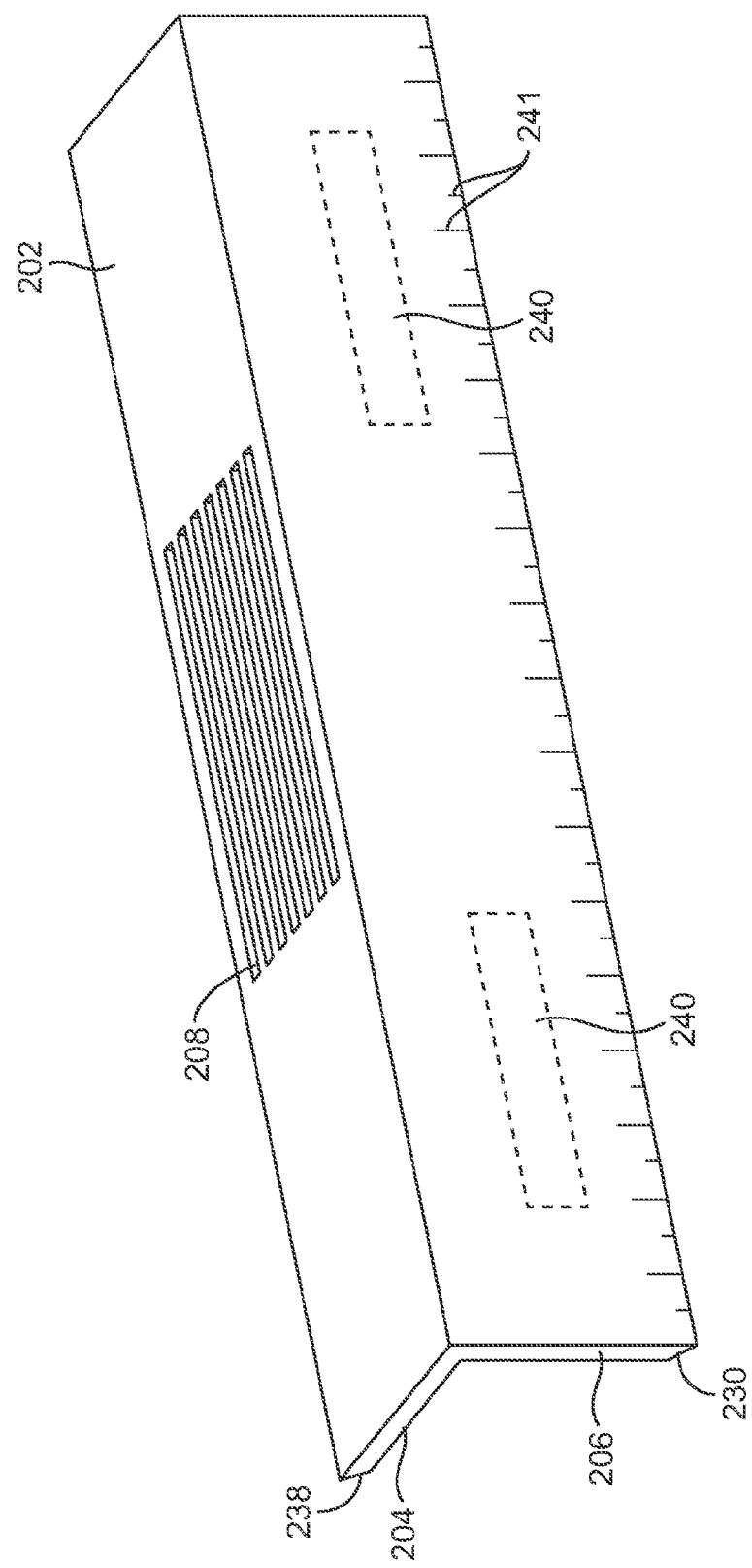
FIG. 8 is a perspective view of a body according to some embodiments.

Referring now to FIG. 8, in some configurations, the body 202 includes recesses 208 or other such alignment structures that are formed only on a portion of the body 202. This portion can be the substantially the same size and the footprint of the bubble housing or it can be slightly or substantially larger. In some instances, two or more portions of the body 202 include such recesses or other alignment structures so that the bubble housing 212 can be selectively positioned on different locations along the body 202. Accordingly, in some configurations, the bubble housing 212 is selectively coupled to the body 202, rather than permanently coupled. As such, the bubble housing may be selectively coupled with a removable screw, a removable pin, or other such fastener.

In some configurations, as shown in FIG. 8, the body 202 includes one or more magnets 240 coupled thereto 202. These magnets 240, such as magnet strips, spot magnets, etc., can be embedded in or fastened to the body 202. Alternatively, the body 202 can be partially or entirely magnetized. In some embodiments, one or more magnetic strips may extend the length of the body. In other embodiments, one or more magnets may be embedded within the longitudinal edges of the body 202, such as along the angled edges 238. Magnets may allow the level to adhere to any ferrous materials. This may be particularly advantages for HVAC, commercial contractors who work with steel framing materials, and metal workers. Furthermore, in some embodiments, a linear measurement 241, such as a ruler or measurement markings are included on the body 202. Such linear measurements 241 can be included on material that is glued or otherwise fastened to the body 202. Alternatively, such linear measurement 241 can be etched, printed, or written on the body 202, as shown.

Figure 9:
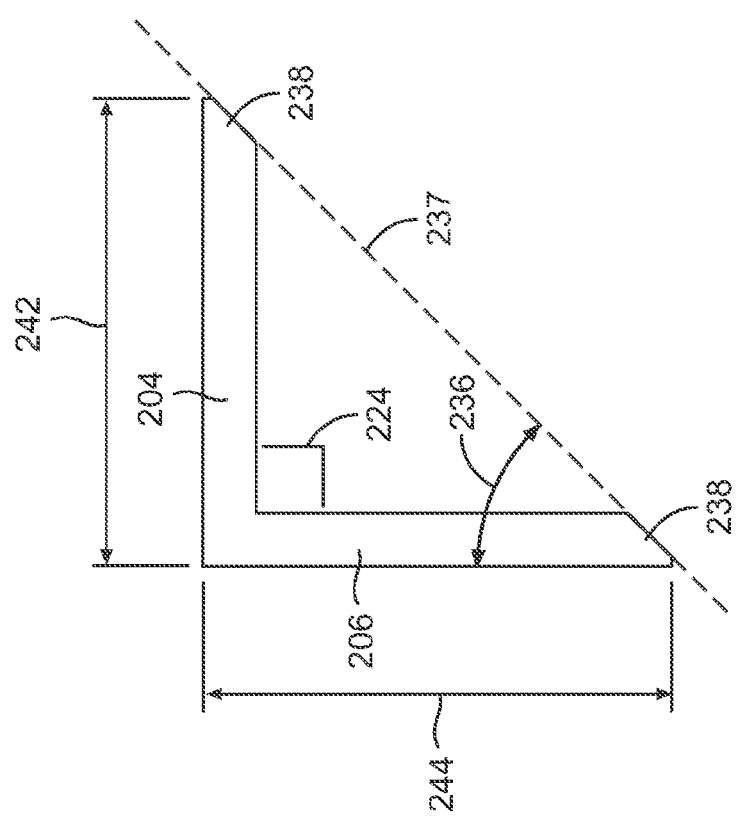
FIG. 9 is an end view of the body of FIG. 8.

FIGS. 8 and 9 also illustrate the two side members 204, 206 having angled edges 238, which are cut along a common plane 237. As shown the two side members 204, 206 join at a right angle 224. FIG. 9 depicts an end view of a body 202 having angled edges 238. By selecting the angle 236 of these angled edges 238 to provide edge surfaces on common plane 237, these edges combine to provide another surface upon which the level can be placed when measuring the inclination of a surface. In some configurations, the side members 204, 206 have equal lengths 242, 244 and the angles 236 between the common plane and the side members is the same. In some instances, angle 236 is a forty-five degree angle. Angle 236 may be in the range of forty-five degree plus or minus ten degrees. In other configurations, the side members 204, 206 have different lengths 242, 244.

Figure 10:
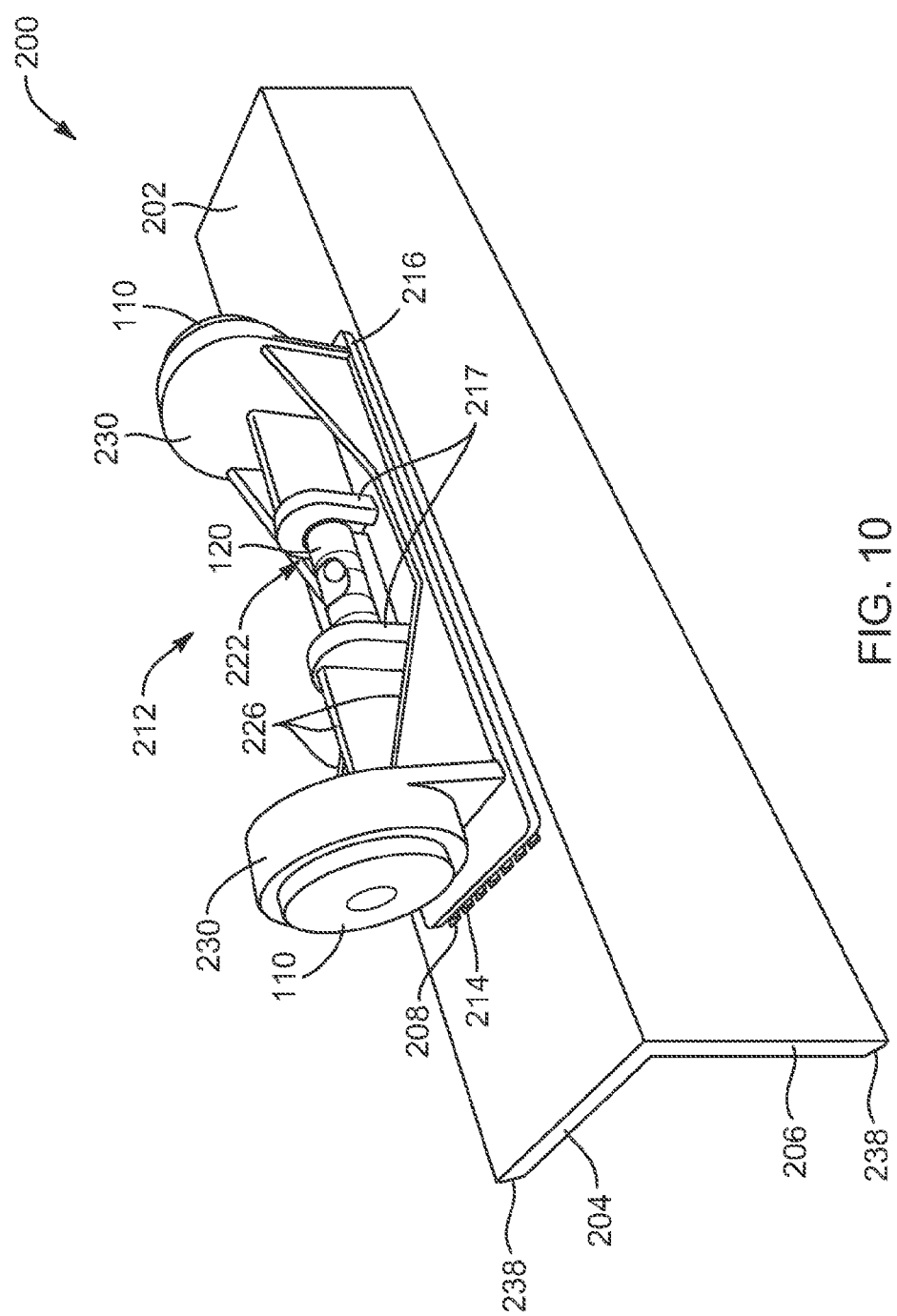
FIG. 10 is a perspective view of a multi-axis level having two bull's eye bubble levels and a single tubular bubble level, according to some embodiments.

Referring now to FIG. 10, a multi-axis level 200 is illustrated having a bubble housing 212 that houses two bull's eye bubble levels 110 as well as a tubular bubble level 120. As shown, the two bull's eye bubble levels 210 can be disposed on opposite ends of the bubble housing 212, one on a first end and another on a second end. The two bull's eye bubble levels 110 are oriented in opposite directions to provide a wider range of possible orientations to the multi-axis level 200. The tubular bubble level 120 can be located at any location on the bubble housing 212, including between the two bull's eye bubble levels 110, or on one of the ends of the bubble housing 212.

As shown in FIGS. 10 and 13-14, the configuration of the bubble housing 212 that houses two bull's eye bubble levels 110 can be similar to that of the bubble housing 112 that houses only a single bull's eye bubble level 110, illustrated in FIG. 1, only that it has two bull's eye bubble housings 230 and supports 226 that strengthen the second bull's eye bubble housings 230. Also, in some embodiments, the lower surface 216 of a bubble housing 212 for two bull's eye bubble levels 110 is elongated to support the second bull's eye bubble level 110. This lower surface 216 can include protrusions 214 that coupled to and within grooves 208 in the body 202. As depicted FIGS. 11 and 13 show bubble housings 212 having different support 226 configurations.

Figure 11:
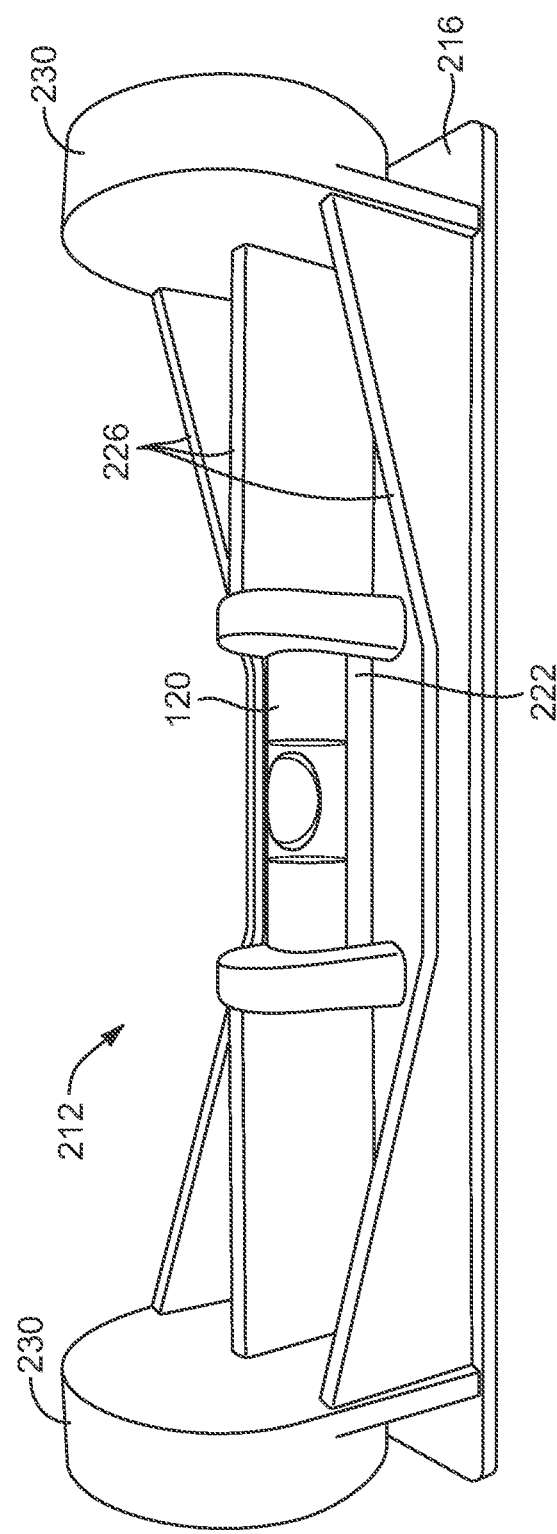
FIG. 11 is a side perspective view of a bubble housing capable of housing two bull's eye bubble levels and a single tubular bubble level, according to some embodiments.

FIG. 11 depicts a bubble housing 212 that houses a tubular bubble level 120 within a receptacle 222 formed between two tubular bubble supports 217 and a cap 250 (shown in FIGS. 12, 16, and 17), according to some embodiments. The tubular bubble supports 217 can have semi-circular geometries that support the exterior surface of the vial of the tubular bubble level 120. The receptacle 222 is shaped and sized to tightly receive the tubular bubble level 120 so that it does not wiggle, dislodge, or shake therein. As shown, the receptacle includes a window that opens to permit the user to view the tubular bubble level therethrough.

Figure 12:
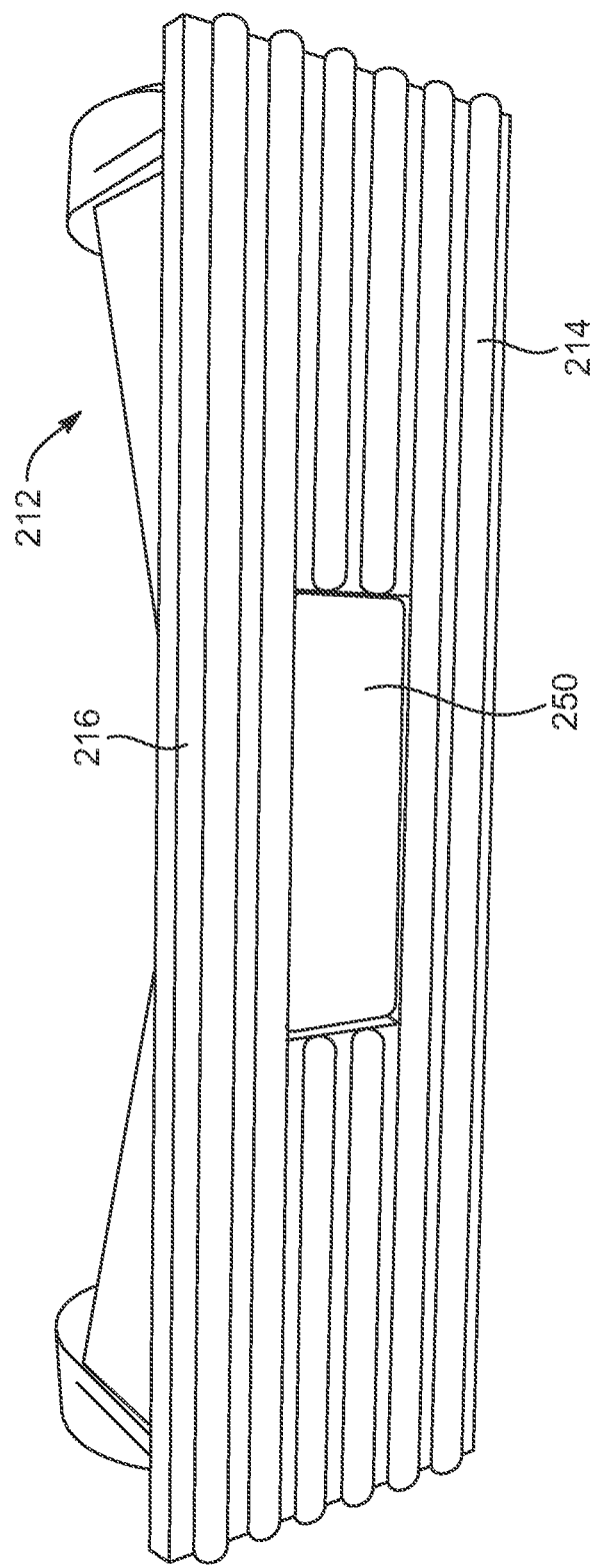
FIG. 12 is a bottom perspective view of the bubble housing of FIG. 11.

FIG. 12 depicts the bottom of a cap 250 that closes the receptacle to contain the tubular bubble level 120 therein. This figure illustrates a perspective view of the bottom of a bubble housing 212 with the cap 250 therein. In some instances, the cap 250 is temporarily removed so that the tubular bubble level 120 can be inserted or removed from within the receptacle 222. FIG. 15 illustrates a bottom view of the bubble housing, when the cap 250 is removed, exposing the internal cavity 252 that receives the tubular bubble level 120. FIGS. 16 and 17 depict top and side views, respectively, of the cap 250. As shown, the top side of the cap includes a semicircular geometry 254 or stabilizing structure on at least a part of the top side that supports and stabilizes a tubular bubble level 120. Thus, once a tubular bubble level 120 is inserted into the cavity 252 via the bottom of a bubble housing 252, the cap 250 pushes it fully into the receptacle 222 and holds it snuggly in place. In some embodiments, the cap 250 is fastened closed, such as with a chemical adhesive or mechanical fastener.

The multi-axis level 200 may be fabricated in different lengths and widths depending on the anticipated use. For example, the multi-axis level may be fabricated in a standard length, such as 18 inches, which is suitable for many home, do-it-yourself applications. The multi-axis level may also be fabricated in other lengths, such as 6 inches, 12 inches, 24 inches, 30 inches, 36 inches, 42 inches, 48 inches, 54 inches, 60 inches, 66 inches, 72 inches, 78 inches, 84 inches, 90 inches, 96 inches, or lengths between these listed values or below or above them. The multi-axis level may also be fabricated for use by the specialty worker such as appliance installer, fence builder or pole installer.

Figure 18:
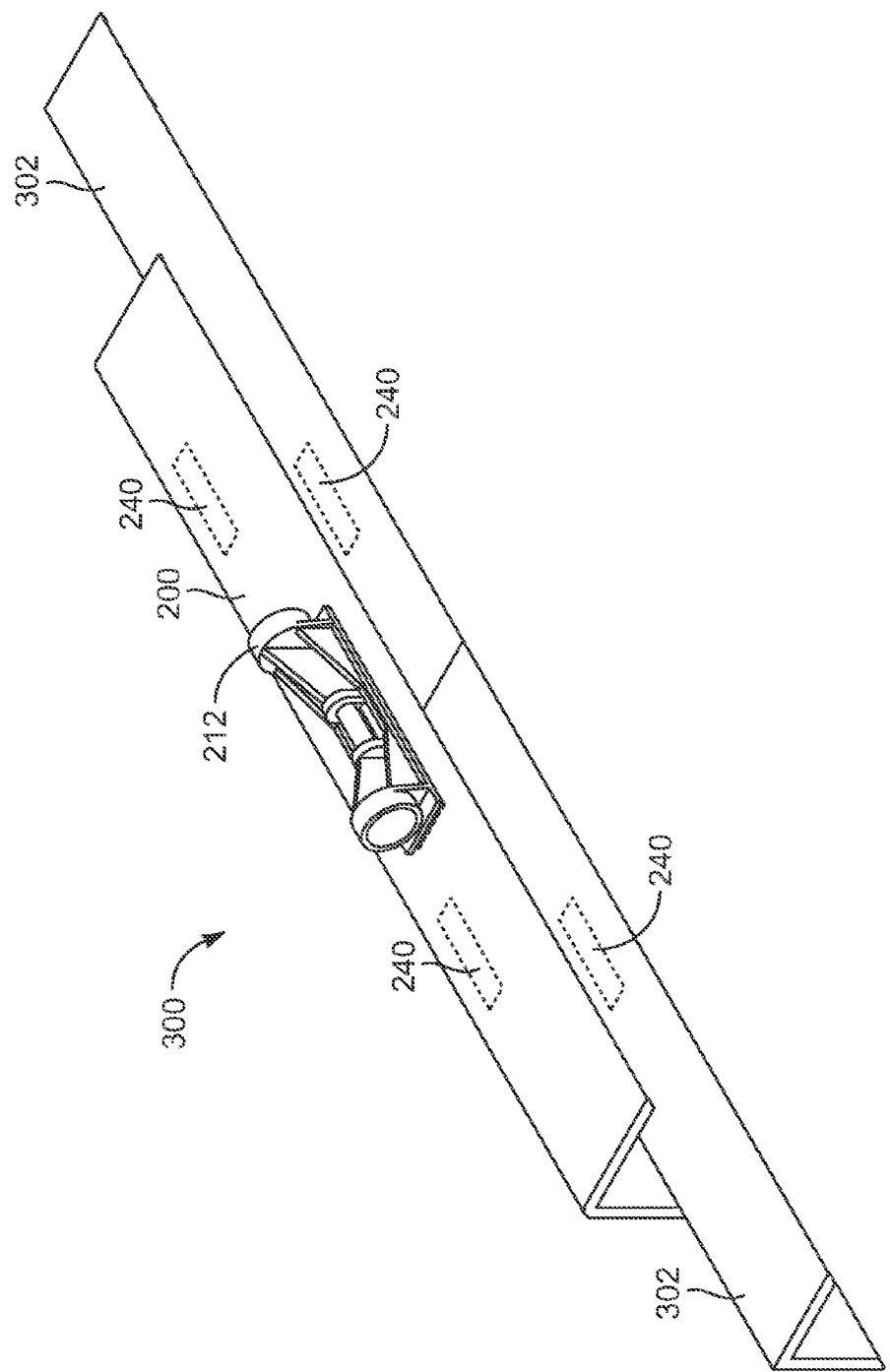
FIG. 18 is a perspective view of a multi-axis level having two additional body members forming an extended level.

In some instances, it can be beneficial to increase the length of an existing multi-axis level 200. Accordingly, as shown in FIG. 18, in some configurations, a multi-axis level system 300 includes a multi-axis level 200, having a body 202 and a bubble housing 212, which is selectively coupled to one or more additional body members 302 to temporarily increase its length. As shown, two body members 302 can be coupled simultaneously to the multi-axis level 200 to increase its length. Alternatively, a single body member 302 can be coupled to the multi-axis level 200 to increase its length. These body members 302 can include magnets 240 coupled thereto, as mentioned, which hold the body members 302 together with the level 200. In other instances, the body members 302 are held together using Velcro™, latches, adhesives, adhesive tape, hooks, snaps, or other like devices. Once coupled, the multi-axis level system 300 can have an extended length that could be used temporarily or for longer terms. In some configurations, the multi-axis level system 300 is a kit that includes the multi-axis level 200 along with one or more extended body members 302. For example, a two foot multi-axis level 200 can be part of a kit that includes three additional body members 302, which have lengths of two feet, four feet, and six feet. This example is only representative. It will be noted that a variety of quantities and lengths of body members 302 can be included as extension in a multi-axis level kit.

From the foregoing it will be seen that the present multi-axis level enables users to instantly level any object or apparatus that has a vertical plane or angle that is perpendicular to horizontal, as well as level planar and non-planar horizontal surfaces. Furthermore, the multi-axis level can be combined with extended body members to temporarily lengthen the multi-axis level when needed.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A multi-axis level, comprising:
    a body member comprising two planar side members joined at a common edge thereof to form a right angle therebetween, the body and side members having a length extending in a longitudinal direction, wherein each side member has an interior surface and an exterior surface;
    a bubble housing coupled to the body member on an exterior surface of one of the side members;
    one or more bull's eye bubble levels coupled to the bubble housing and oriented in a plane normal to the longitudinal direction, wherein when the interior surfaces of the side members are positioned against an object having a vertical plane or angle, the one or more bull's eye bubble levels indicate whether the object is plumb in all vertical directions at the same time; and
    a tubular bubble level coupled to the bubble housing, the tubular bubble level having a length that is oriented parallel to the longitudinal direction.

2. The multi-axis level of claim 1, wherein the one or more bull's eye bubble levels include a first bull's eye bubble level disposed on a first end of the bubble housing and a second bull's eye level disposed on a second end of the bubble housing and oriented in an opposite direction to the first bull's eye bubble level.

3. The multi-axis level of claim 2, wherein the tubular bubble level is disposed between the two bull's eye bubble levels.

4. The multi-axis level of claim 1, further comprising at least one or more additional body members having a combined length greater than the length of the body member, and further comprising a fastener to selectively couple the body member to the one or more additional body members.

5. The multi-axis level of claim 1, wherein the body member includes one or more recesses formed on the surface thereof, and the bubble housing includes one or more protrusions extending therefrom and mating with the one or more recesses of the body.

6. The multi-axis level of claim 5, wherein the one or more protrusions are longitudinal ribs, and the one or more recesses are longitudinal grooves.

7. The multi-axis level of claim 1, further comprising one or more magnets coupled to the body member.

8. The multi-axis level of claim 1, wherein bubble housing has an internal receptacle and a receptacle cap, the tubular bubble level being housed within the internal receptacle of the bubble housing, and the receptacle cap selectively closing the opening of the receptacle to retain the tubular bubble level within the internal receptacle.

9. The multi-axis level of claim 1, wherein the body member and the bubble housing are made of acrylonitrile butadiene styrene (ABS) plastic.

10. The multi-axis level of claim 1, wherein at least one of the two side members of the body member includes linear measurements thereon.

11. The multi-axis level of claim 1, wherein the two side members each have an angled edge with an edge surface, wherein the edge surfaces are disposed on a common plane.

12. The multi-axis level of claim 1, further comprising a second bubble housing having a bull's eye bubble level.

13. A multi-axis level, comprising:
- a body member extending in a longitudinal direction comprising two side members joined at a common edge thereof to form a right angle therebetween, wherein each side member has a substantially flat interior surface and an exterior surface;
- a bubble housing coupled to the body member on an exterior surface of one of the side members;
- two bull's eye bubble levels coupled to the bubble housing and oriented in separate planes that are normal to the longitudinal direction, the two bull's eye bubble levels being oriented in opposite directions, wherein when the interior surfaces of the side members are positioned against an object having a vertical plane or angle, at least one of the bull's eye bubble levels indicates whether the object is plumb in all vertical directions at the same time; and
- a tubular bubble level having a tube with two ends, the two ends of the tube each being coupled to the bubble housing, the tubular bubble level having a length that is oriented parallel to the longitudinal direction.

14. The multi-axis level of claim 13, wherein the tubular bubble level is disposed between the two bull's eye bubble levels.

15. The multi-axis level of claim 13, further comprising at least one or more additional body members having a combined length greater than the length of the body member, and further comprising a fastener to selectively couple the body member to the one or more additional body members.

16. The multi-axis level of claim 13, wherein the body member includes one or more recesses formed on the surface thereof, and the bubble housing includes one or more protrusions extending therefrom and mating with the one or more recess of the body.

17. The multi-axis level of claim 16, wherein the one or more protrusions are ribs, and the one or more recesses are grooves.

18. The multi-axis level of claim 13, wherein the body member and the bubble housing are made of acrylonitrile butadiene styrene (ABS) plastic.

19. The multi-axis level of claim 13, wherein the two side members each have an angled edge having an edge surface disposed on a common plane.

20. A multi-axis level, comprising:
- a body member having two equal-length side members, the two side members each having a substantially flat surface that join together to form a right angle, the body having a length extending in a longitudinal direction, the two side members each having an angled edge with an edge surface that is disposed on a common plane, the body member having one or more recesses formed therein;
- a bubble housing having one or more protrusions extending therefrom that are coupled to the one or more recess within the body; the bubble housing having an internal receptacle therein that is shaped and sized to house a tubular bubble level;
- two bull's eye bubble levels coupled to the bubble housing and oriented in a plane normal to the longitudinal direction, the two bull's eye bubble levels being oriented in opposite directions; and
- the tubular bubble level housed within the internal receptacle of the bubble housing, the tubular bubble level having a length that is oriented parallel to the longitudinal direction.

* * * * *